US009937590B2

(12) United States Patent
Cathry et al.

(10) Patent No.: US 9,937,590 B2
(45) Date of Patent: Apr. 10, 2018

(54) LASER PROCESSING MACHINE

(75) Inventors: Daniel Cathry, Roethenbach (CH);
Ernest Imboden, Steinhof (CH);
Tobias Bugmann, Aarwangen (CH);
David Broger, Burgdorf (CH); Thierry Perrin, Aeschi (CH)

(73) Assignee: BYSTRONIC LASER AG, Niederoenz (CH)

( * ) Notice: Subject to any disclaimer, the term of this patent is extended or adjusted under 35 U.S.C. 154(b) by 659 days.

(21) Appl. No.: 13/703,723

(22) PCT Filed: Jul. 21, 2011

(86) PCT No.: PCT/IB2011/053257
§ 371 (c)(1),
(2), (4) Date: Jan. 22, 2013

(87) PCT Pub. No.: WO2012/011072
PCT Pub. Date: Jan. 26, 2012

(65) Prior Publication Data
US 2013/0112671 A1    May 9, 2013

Related U.S. Application Data

(60) Provisional application No. 61/374,665, filed on Aug. 18, 2010.

(30) Foreign Application Priority Data

Jul. 22, 2010 (EP) .................................... 10170451

(51) Int. Cl.
*B23K 26/38*     (2014.01)
*B23K 26/04*     (2014.01)
(Continued)

(52) U.S. Cl.
CPC .............. *B23K 26/38* (2013.01); *B23K 26/04* (2013.01); *B23K 26/042* (2015.10);
(Continued)

(58) Field of Classification Search
CPC .. B23K 26/04; B23K 26/041; B23K 26/1494; B23K 26/38; B23K 26/043;
(Continued)

(56) References Cited

U.S. PATENT DOCUMENTS 3,423,593 A * 1/1969 Chinnock .................. 250/206.2
3,590,840 A * 7/1971 Hyer ............................ 137/806
(Continued)

FOREIGN PATENT DOCUMENTS

CN    201220326 Y    4/2009
CN    102117053 A    7/2011
(Continued)

OTHER PUBLICATIONS

International Search Report and International Preliminary Report on Patentability, dated Dec. 5, 2011, from parent PCT/IB2011/053257; in English.
(Continued)

*Primary Examiner* — Eric Stapleton
(74) *Attorney, Agent, or Firm* — Workman Nydegger

(57) ABSTRACT

Laser processing machines, such as laser cutting machine (LM), including a work table receiving workpiece (W), and work arm (1) with a laser cutting head (2). Laser cutting head (2) includes nozzle receiving device (7) and nozzle (D). Via nozzle (D) laser beam (11) may be directed onto work piece (W). Machine (LM) includes main drives moving work arm (1) and/or the laser cutting head (2) on X-Y-Z axes to process work piece (W), as well as an alignment unit to adjust laser beam (11). An adjusting station (3) includes receiving unit (31) fixing nozzle (D) and/or the nozzle
(Continued)

receiving device (7) during centering of nozzle (D). The alignment unit has head element (5B) in laser cutting head (2). Head element (5B) receives nozzle (D) and/or the nozzle receiving device (7) and is slidable in X-Y directions, via the main drives. Head element (5B) may be fixed in a selected position, within the laser cutting head (2), via clamping device (12) releasable during nozzle centering at adjusting station (3).

17 Claims, 3 Drawing Sheets

(51) Int. Cl.
  *B23K 26/14*  (2014.01)
  *B23K 26/042* (2014.01)
  *B23K 26/70*  (2014.01)

(52) U.S. Cl.
  CPC ........ *B23K 26/043* (2013.01); *B23K 26/1494* (2013.01); *B23K 26/705* (2015.10); *Y10T 29/49778* (2015.01)

(58) Field of Classification Search
  CPC .. B23K 26/426; B23K 26/705; B23K 26/042; Y10T 29/49778
  USPC .................................... 219/121.67; 29/407.09
  See application file for complete search history.

(56) References Cited

U.S. PATENT DOCUMENTS

| | | | |
|---|---|---|---|
| 3,692,414 A | 9/1972 | Hosterman et al. | |
| 3,736,402 A * | 5/1973 | Mefferd et al. | 219/121.67 |
| 3,843,865 A * | 10/1974 | Nath | 219/121.6 |
| 4,335,296 A * | 6/1982 | Bredow | 219/121.67 |
| 4,406,940 A | 9/1983 | Tsutsumi | 219/121.79 |
| 4,427,873 A * | 1/1984 | Orita et al. | 219/121.7 |
| 4,634,832 A * | 1/1987 | Martyr | 219/121.63 |
| 4,644,128 A * | 2/1987 | Palentyn et al. | 219/121.67 |
| 4,668,088 A * | 5/1987 | Quinque et al. | 356/138 |
| 4,675,501 A * | 6/1987 | Klingel | 219/121.67 |
| 4,698,480 A * | 10/1987 | Klingel | 219/121.67 |
| 4,728,771 A | 3/1988 | Sartorio | |
| 4,772,772 A | 9/1988 | Juptner et al. | |
| 4,806,726 A * | 2/1989 | Rosa et al. | 219/121.67 |
| 4,940,880 A * | 7/1990 | Klingel et al. | 219/121.67 |
| 4,950,861 A * | 8/1990 | Erlenmaier et al. | 219/121.67 |
| 5,008,510 A * | 4/1991 | Koseki | 219/121.7 |
| 5,039,836 A * | 8/1991 | Lemelson | 219/121.13 |
| 5,045,668 A * | 9/1991 | Neiheisel et al. | 219/121.83 |
| 5,132,510 A * | 7/1992 | Klingel et al. | 219/121.82 |
| 5,272,312 A | 12/1993 | Jurca | |
| 5,304,773 A * | 4/1994 | Kilian et al. | 219/121.78 |
| 5,371,336 A * | 12/1994 | Albert et al. | 219/121.54 |
| 5,373,135 A * | 12/1994 | Beyer et al. | 219/121.67 |
| 5,463,202 A | 10/1995 | Kurosawa et al. | |
| 5,463,215 A * | 10/1995 | Alfille | 250/206.1 |
| 5,491,318 A * | 2/1996 | Sugawara et al. | 219/121.67 |
| 5,525,776 A * | 6/1996 | Okamoto | 219/121.68 |
| 5,548,098 A * | 8/1996 | Sugawara et al. | 219/121.67 |
| 5,667,707 A * | 9/1997 | Klingel et al. | 219/121.67 |
| 5,685,999 A * | 11/1997 | Wiedemann et al. | 219/121.83 |
| 5,698,120 A * | 12/1997 | Kurosawa et al. | 219/121.62 |
| 5,751,436 A * | 5/1998 | Kwon et al. | 219/121.68 |
| 5,886,319 A * | 3/1999 | Preston et al. | 219/121.72 |
| 5,915,316 A * | 6/1999 | Tajima et al. | 112/470.05 |
| 5,968,382 A * | 10/1999 | Matsumoto et al. | 219/121.72 |
| 5,969,335 A * | 10/1999 | Karasaki | 250/205 |
| 5,998,768 A * | 12/1999 | Hunter et al. | 219/502 |
| 6,031,200 A | 2/2000 | Whitehouse | |
| 6,040,549 A | 3/2000 | Kanaoka | |
| 6,044,308 A * | 3/2000 | Huissoon | 700/166 |
| 6,124,565 A * | 9/2000 | Morishita et al. | 219/121.67 |
| 6,188,041 B1 * | 2/2001 | Kim et al. | 219/121.63 |
| 6,204,473 B1 * | 3/2001 | Legge | 219/121.67 |
| 6,260,976 B1 * | 7/2001 | Endou et al. | 359/846 |
| 6,284,999 B1 * | 9/2001 | Virtanen et al. | 219/121.67 |
| 6,288,363 B1 * | 9/2001 | Kaga et al. | 219/121.84 |
| 6,300,592 B1 * | 10/2001 | Ulrich et al. | 219/121.67 |
| 6,316,743 B1 * | 11/2001 | Nagahori et al. | 219/121.67 |
| 6,326,586 B1 * | 12/2001 | Heyerick et al. | 219/121.67 |
| 6,376,798 B1 * | 4/2002 | Remue et al. | 219/121.75 |
| 6,392,192 B1 * | 5/2002 | Cole et al. | 219/121.83 |
| 6,393,687 B1 * | 5/2002 | Friedrich | 29/560 |
| 6,417,487 B2 * | 7/2002 | Nagura et al. | 219/121.84 |
| 6,419,146 B1 * | 7/2002 | Buldhaupt et al. | 228/193 |
| 6,455,807 B1 * | 9/2002 | Scott | 219/121.72 |
| 6,462,301 B1 * | 10/2002 | Scott et al. | 219/121.67 |
| 6,528,762 B2 * | 3/2003 | Mayer | 219/121.83 |
| 6,588,738 B1 * | 7/2003 | Sukuvaara et al. | 269/293 |
| 6,649,866 B2 * | 11/2003 | Reichmann et al. | 219/121.84 |
| 6,670,574 B1 * | 12/2003 | Bates et al. | 219/121.64 |
| 6,693,256 B2 * | 2/2004 | Furujo et al. | 219/121.72 |
| 6,777,641 B2 * | 8/2004 | Cole et al. | 219/121.67 |
| 6,777,646 B2 * | 8/2004 | Schubert | 219/121.75 |
| 6,822,187 B1 * | 11/2004 | Hermann et al. | 219/121.63 |
| 6,833,911 B2 * | 12/2004 | Lizotte | 356/71 |
| 6,886,284 B2 * | 5/2005 | Lizotte | 42/1.01 |
| 6,934,014 B1 * | 8/2005 | Kleinhuber | 356/72 |
| 7,005,606 B2 * | 2/2006 | Legge et al. | 219/121.83 |
| 7,038,166 B2 * | 5/2006 | Denney et al. | 219/121.86 |
| 7,060,932 B2 * | 6/2006 | Denney et al. | 219/121.6 |
| 7,124,420 B2 * | 10/2006 | Murata et al. | 720/671 |
| 7,180,920 B2 * | 2/2007 | Denney et al. | 372/38.02 |
| 7,286,223 B2 * | 10/2007 | Denney et al. | 356/318 |
| 7,289,206 B2 * | 10/2007 | Denney et al. | 356/318 |
| 7,345,257 B2 * | 3/2008 | Yamazaki et al. | 219/121.6 |
| 7,379,483 B2 * | 5/2008 | Denney et al. | 372/38.02 |
| 7,407,861 B2 | 8/2008 | Couch et al. | |
| 7,492,453 B2 * | 2/2009 | Denney et al. | 356/318 |
| 7,505,504 B2 * | 3/2009 | Sakai et al. | 372/55 |
| 7,528,344 B2 * | 5/2009 | Horn et al. | 219/121.83 |
| 7,570,443 B2 * | 8/2009 | Blasenheim et al. | 359/822 |
| 7,620,085 B2 * | 11/2009 | Denney et al. | 372/38.02 |
| 7,667,159 B2 | 2/2010 | Pailthorp et al. | |
| 7,848,552 B2 | 12/2010 | Schutze et al. | |
| 7,864,315 B2 * | 1/2011 | Denney et al. | 356/318 |
| 8,049,132 B2 | 1/2011 | Bouet et al. | |
| 7,880,114 B2 * | 2/2011 | Denney et al. | 219/121.6 |
| 7,880,877 B2 * | 2/2011 | Denney et al. | 356/302 |
| 8,040,619 B2 * | 10/2011 | Blasenheim et al. | 359/822 |
| 8,094,303 B2 * | 1/2012 | Denney et al. | 356/318 |
| RE43,400 E | 5/2012 | O'Brien et al. | |
| RE43,487 E | 6/2012 | O'Brien et al. | |
| 8,198,566 B2 | 6/2012 | Baird | |
| 8,217,301 B2 * | 7/2012 | Schmauder et al. | 219/121.67 |
| 8,228,501 B2 * | 7/2012 | Denney et al. | 356/318 |
| RE43,605 E | 8/2012 | O'Brien et al. | |
| 8,258,425 B2 * | 9/2012 | Denney et al. | 219/121.67 |
| 8,306,079 B2 * | 11/2012 | Denney et al. | 372/38.02 |
| 8,314,361 B2 * | 11/2012 | Harnisch et al. | 219/121.67 |
| 8,338,743 B2 | 12/2012 | Wanner et al. | |
| 8,383,980 B2 * | 2/2013 | Yamazaki et al. | 219/121.67 |
| 8,439,811 B2 * | 5/2013 | Erlenmaier et al. | 483/16 |
| 8,519,299 B2 * | 8/2013 | Schmauder et al. | 219/121.6 |
| 8,624,158 B2 * | 1/2014 | Denney et al. | 219/121.78 |
| 8,638,509 B2 * | 1/2014 | Blasenheim et al. | 359/822 |
| 8,710,398 B2 | 4/2014 | Boynton et al. | |
| 2002/0177288 A1 | 11/2002 | Brown et al. | |
| 2003/0006221 A1 | 1/2003 | Hong et al. | |
| 2003/0014895 A1 * | 1/2003 | Lizotte | 42/1.01 |
| 2003/0183608 A1 * | 10/2003 | Yamazaki et al. | 219/121.83 |
| 2003/0192865 A1 | 10/2003 | Cole et al. | |
| 2003/0204283 A1 | 10/2003 | Picard et al. | |
| 2003/0234242 A1 * | 12/2003 | McCoy | 219/121.67 |
| 2003/0234243 A1 * | 12/2003 | McCoy | 219/121.72 |
| 2003/0234244 A1 * | 12/2003 | McCoy | 219/121.72 |
| 2004/0027630 A1 * | 2/2004 | Lizotte | 359/15 |
| 2004/0029362 A1 | 2/2004 | Liu | |
| 2004/0182839 A1 * | 9/2004 | Denney et al. | 219/121.78 |
| 2004/0182840 A1 * | 9/2004 | Denney et al. | 219/121.78 |
| 2004/0182841 A1 * | 9/2004 | Denney et al. | 219/121.78 |

(56) References Cited

U.S. PATENT DOCUMENTS

| | | |
|---|---|---|
| 2004/0182842 A1* | 9/2004 | Denney et al. .......... 219/121.84 |
| 2004/0182998 A1* | 9/2004 | Denney et al. .......... 250/227.14 |
| 2004/0182999 A1* | 9/2004 | Denney et al. .......... 250/227.14 |
| 2004/0208212 A1* | 10/2004 | Denney et al. ............ 372/38.02 |
| 2005/0017156 A1 | 1/2005 | Ehrmann et al. |
| 2005/0040150 A1* | 2/2005 | Denney et al. .......... 219/121.84 |
| 2005/0051523 A1* | 3/2005 | Legge et al. ............. 219/121.83 |
| 2005/0062583 A1 | 3/2005 | Naumov et al. |
| 2005/0098547 A1 | 5/2005 | Cali et al. |
| 2005/0109738 A1 | 5/2005 | Hewett et al. |
| 2005/0167403 A1 | 8/2005 | Petring |
| 2005/0213881 A1* | 9/2005 | Leclerc et al. .................. 385/31 |
| 2006/0049158 A1 | 3/2006 | Schurmann et al. |
| 2006/0144834 A1* | 7/2006 | Denney et al. .......... 219/121.84 |
| 2007/0075050 A1 | 4/2007 | Heyl |
| 2007/0075060 A1 | 4/2007 | Shedlov et al. |
| 2007/0088409 A1 | 4/2007 | Bischoff et al. |
| 2007/0119829 A1* | 5/2007 | Vietz et al. ............. 219/121.63 |
| 2007/0193987 A1 | 8/2007 | Bischoff et al. |
| 2007/0193988 A1* | 8/2007 | De Joannis De Verclos et al. ........ 219/121.78 |
| 2007/0228025 A1* | 10/2007 | Horn et al. .............. 219/121.78 |
| 2007/0284345 A1 | 12/2007 | Ando et al. |
| 2008/0000888 A1 | 1/2008 | Schulz et al. |
| 2008/0031298 A1* | 2/2008 | Sakai et al. ..................... 372/55 |
| 2008/0067331 A1* | 3/2008 | Denney et al. .......... 250/227.11 |
| 2008/0212623 A1 | 9/2008 | Bischoff et al. |
| 2009/0001063 A1* | 1/2009 | Weick et al. ............ 219/121.85 |
| 2009/0021731 A1* | 1/2009 | Denney et al. ................ 356/318 |
| 2009/0057283 A1* | 3/2009 | Schmauder et al. ..... 219/121.72 |
| 2009/0152249 A1 | 6/2009 | Petro et al. |
| 2009/0181838 A1* | 7/2009 | Schmauder ..................... 483/58 |
| 2009/0240368 A1 | 9/2009 | Young, Jr. et al. |
| 2009/0284739 A1* | 11/2009 | Denney et al. ................ 356/318 |
| 2010/0044353 A1 | 2/2010 | Olsen |
| 2010/0071220 A1* | 3/2010 | Thompson et al. ............. 33/228 |
| 2010/0134628 A1* | 6/2010 | Pfitzner et al. ............... 348/159 |
| 2010/0176103 A1 | 7/2010 | Schulz et al. |
| 2010/0188669 A1* | 7/2010 | Rushford ..................... 356/616 |
| 2011/0102789 A1* | 5/2011 | Denney et al. ................ 356/318 |
| 2011/0210107 A1 | 9/2011 | Hammann et al. |
| 2011/0266262 A1* | 11/2011 | Denney et al. .......... 219/121.62 |
| 2011/0287607 A1 | 11/2011 | Osako et al. |
| 2012/0145687 A1 | 6/2012 | Wolfel |
| 2012/0228274 A1* | 9/2012 | Schmauder et al. ....... 219/121.6 |
| 2013/0068738 A1 | 3/2013 | Schurmann et al. |
| 2013/0126489 A1 | 5/2013 | Buschulte |
| 2013/0134141 A1 | 5/2013 | Santner et al. |
| 2013/0146569 A1 | 6/2013 | Woods et al. |
| 2013/0184839 A1 | 7/2013 | Bauer et al. |
| 2013/0319980 A1 | 12/2013 | Hesse et al. |
| 2014/0034614 A1 | 2/2014 | Sbetti et al. |
| 2015/0069028 A1 | 3/2015 | Jennings et al. |

FOREIGN PATENT DOCUMENTS

| | | |
|---|---|---|
| CN | 102855326 A | 1/2013 |
| DE | 8710866 U1 | 12/1988 |
| DE | 4201640 C1 | 2/1993 |
| DE | 10150129 C1 | 4/2003 |
| DE | 102007013623 A1 | 10/2008 |
| DE | 102007048471 A1 | 4/2009 |
| DE | 102008052592 A1 | 4/2010 |
| DE | 102009044751 A1 | 6/2010 |
| EP | 0597771 A1 | 5/1994 |
| EP | 0680805 B1 | 1/2001 |
| EP | 0991493 B1 | 7/2004 |
| EP | 1561538 A1 | 8/2005 |
| EP | 1600248 A2 | 11/2005 |
| EP | 1634673 A1 | 3/2006 |
| EP | 1693141 A2 | 8/2006 |
| EP | 1693141 A3 | 7/2008 |
| EP | 1967316 A1 | 9/2008 |
| EP | 1600248 A3 | 10/2008 |
| EP | 2169491 A1 | 3/2010 |
| EP | 2243557 A1 | 10/2010 |
| EP | 1574485 B1 | 3/2013 |
| JP | S56-041092 A | 4/1981 |
| JP | H03-027889 A | 2/1991 |
| JP | H07-144289 A | 6/1995 |
| JP | H09-076084 A | 3/1997 |
| JP | H10-249566 A | 9/1998 |
| JP | H11-077356 A | 3/1999 |
| JP | 2009-129513 A | 6/2009 |
| KR | 100699247 B1 | 3/2007 |
| WO | 97/07928 A1 | 3/1997 |
| WO | 02/080081 A1 | 10/2002 |
| WO | 02/100587 A1 | 12/2002 |
| WO | 03/002289 A1 | 1/2003 |
| WO | 2004/087362 A2 | 10/2004 |
| WO | 2006/031577 A2 | 3/2006 |
| WO | 2006/138605 A2 | 12/2006 |
| WO | 2008/052591 A1 | 5/2008 |
| WO | 2009/007708 A2 | 1/2009 |
| WO | 2009/014307 A1 | 1/2009 |
| WO | 2009/157034 A1 | 12/2009 |
| WO | 2011/035888 A1 | 3/2011 |
| WO | 2011/051567 A2 | 5/2011 |
| WO | 2011/083087 A1 | 7/2011 |
| WO | 2011/083205 A1 | 7/2011 |
| WO | 2012/000995 A1 | 1/2012 |
| WO | 2012/080883 A1 | 6/2012 |

OTHER PUBLICATIONS

EPO Search Report, from priority appl.No. EP10170451 of the present application; dated Jan. 5, 2011; in German.

U.S.Supreme Court petition for writ of certiorari filed on Dec. 3, 2015 in *Media Rights Technologies, Inc.* v. *Capital One Bank* (U.S. Supreme Court Case No. 15-725).

* cited by examiner

LASER PROCESSING MACHINE

This application is a 35 U.S.C. 371 national-phase entry of PCT International application no. PCT/IB2011/053257 filed on Jul. 21, 2011 and also claims benefit of priority to European application no. EP10170451 filed on Jul. 22, 2010, and also claims benefit of priority as a non-provisional of U.S. provisional application Ser. No. 61/374,665 filed on Aug. 18, 2010, and parent application PCT/IB2011/053257, European application no. EP10170451 and U.S. provisional application Ser. No. 61/374,665 are all incorporated herein by reference in their respective entireties, as to all their parts, for all intents and purposes, as if identically set forth in full herein.

TECHNICAL FIELD

The present invention relates to a laser processing machine, in particular to a laser cutting machine.

STATE OF ART

Known laser processing machines, e.g. for cutting metallic work pieces, comprise a laser cutting head on whose end facing the work piece a nozzle is arranged. In the laser cutting head there are lens that focuses the laser beam. In order to obtain impeccable and uniform cutting results it would be necessary for the focal point of the bundled laser beam to be at a fixed distance from the work piece surface. Laser processing machines are usually used for cutting out or cutting off contours from sheet metal parts. Processing such work pieces takes place via a laser beam, emanating from an opening of the nozzle, directed onto the work piece to be processed, and guided along a predetermined cutting contour by means of a main drive of the machine.

In terms of the quality of work, that is achievable, precise adjustments of the focus position and of the point of impact of the laser beam on the work piece play a decisive role. Thus, to obtain an optimal cutting process with laser cutting machines, the laser beam should be centrically guided through the nozzle of a cutting head, a requirement which is not easy to meet in practical application. Since lateral displacement of the lenses in the cutting head, caused by, e.g., changing the lens or relative sliding one of the lenses may cause relative displacement of the optical axis, so regular checks and centering and focusing steps are necessary.

Conventionally, the nozzle of laser cutting machines is adjusted in such a manner that the nozzle body is centered in X-Y directions relative to the nozzle head and is then fixed. Such a nozzle centering is carried out by means of adjusting screws or other additional adjusting devices in the X axis or Y axis on the cutting head or on lens slide-in units. Adjusting the focus position (focusing) in the Z axis is usually carried out manually by means of an adjusting screw.

In the present description the term "adjustment" refers on the one hand to nozzle centering in the plane of the nozzle aperture (i.e. positioning of the nozzle in the directions of the X-Y axes), and on the other hand to laser focusing, i.e. adjustment of the focus position (in the direction of the Z axis).

EP-1,561,538 (A1) describes a device for adjusting laser beam in a laser processing machine, comprising a work piece receiving unit for receiving and bearing the work piece to be processed, and comprising a laser cutting head. To adjust the laser beam, an alignment unit is provided, which is arranged in the direction of propagation of the laser beam in a test station, wherein the laser cutting head is positioned. The alignment unit comprises a nozzle fixing element, a projection element for acquiring a projection of the laser beam in an image plane, and an evaluation or comparison unit. In order to facilitate adjustment of the laser beam, in addition an image pattern in the form of a target is overlaid on the monitor of the laser beam, which target shows the desired position of the laser beam as a central point. In this arrangement, position corrections of the laser beam also take place manually by way of adjustment screws.

The above-mentioned manual adjustment of the laser beam by means of adjustment screws and additional adjustment devices installed between the nozzle and the cutting head is too cumbersome, requires considerable time and overall is not suitable to provide adequate cutting quality in accordance with modern requirements.

JP-H10-249,566(A) discloses a laser beam machine for machining of work pieces by a laser beam emitted from a laser generator by means of a condensing lens and by emitting the laser beam to a work piece through a nozzle. The luminance of the laser beam axial center is detected by a sensor having a photo-electric conversion element for making a comparison between the luminance data thus detected and a set luminance at the time when the axial center of the laser beam is preliminarily in the center of the nozzle, so that a deviation is detected between the center of the nozzle and the axial center of the irradiating light axis. On the basis of the deviation data, the nozzle is adjusted by means of an actuator to align the center of the nozzle with the axial center of the irradiating light axis.

But, it is to be noted that by means of this luminance detecting of the laser beam center a really precise and reproducible processing of work pieces of higher quality requirements cannot be carried out.

SUMMARY OF THE INVENTION

It is the main object of the invention to provide an improved laser processing machine by means of which faster and more reliable and precise checking and adjustment of centering and focusing of a laser beam in the laser processing machine can be carried out, consequently, by means of which the processing quality of the laser machine can be improved.

The above object is solved by an improvement of a laser processing machine according to the invention.

Advantageous versions of solutions according to the invention are also set forth.

The present invention thus relates to a laser processing machine, in particular a laser cutting machine comprising:

A work table for receiving a work piece to be processed, if needed;

A work arm with at least one laser cutting head that comprises a nozzle receiving device and a nozzle arranged therein, by means of which nozzle a laser beam is to be directed onto the work piece to be processed;

Main drives for moving the work arm with the laser cutting head at least in the directions of X-Y axes for processing the work piece;

An alignment unit for adjusting the laser beam.

Furthermore, according to the invention a special adjusting station is provided in an effective working region of the main drives of the work arm. Said adjusting station comprises a receiving unit for fixing the nozzle and/or a nozzle receiving device for centering the nozzle. In this arrangement, the alignment unit is designed in such a manner that in the laser cutting head a head element, preferably a core piece, is provided which receives the nozzle and/or the nozzle receiving device and which is arranged so as to be relative slidable in the X-Y directions, without any additional adjustment device. After the nozzle centering step performed in the adjusting station, said head element can be fixed, in its adjusted position, in the laser cutting head by means of a releasable clamping unit.

By means of the above measures the cutting head can be designed in a relatively simple and economical manner because it is possible to do away with the additional adjustment devices necessary with the cutting head according to the state of the art. On the other hand, one of the main advantages of the present invention lies in that the necessary adjustments for centering the laser beam being able to be carried out by means of the existing main drives of the machine itself, on the proposed adjusting station of the machine, in a given case by means of a CNC control system.

In a preferred version of the invention the laser cutting head features a split design, in particular comprising an upper head section and a lower head section. In this arrangement the head element, which is arranged so as to be laterally slidable, in the lower head section is designed as a cylindrical core piece that is preferably connected to the coaxial nozzle receiving device. Preferably, the lower head section comprises an exterior housing that is attached to the work arm by means of the upper head section. In other words, in the above version the exterior housing is adjusted by the main drives of the machine to the predetermined extent for centering the laser beam; but during this step the core piece with the cutting nozzle is fixed at the adjusting station.

According to a further feature of the invention the releasable clamping device can comprises an annular piston which is arranged in an axial annular space of the laser cutting head, preferably of the housing, and is movable from a basic position, which affixes the laterally slidable head element, to a second position which undoes the fixation of the laterally slidable head element, and back. The annular piston can, for example, be operated pneumatically in the sense of releasing the clamping. If applicable, the annular piston can be in cooperation on the one hand by means of clamping surfaces of the laterally slidable head element, and on the other hand by means of a clamping unit that acts in the sense of a fixation.

In a preferred version the clamping unit of the undoable clamping device comprises at least one spring unit, preferably comprising at least three axial spring assemblies.

Thus the invention does not need any additional adjusting devices, e.g. servo motors or similar (as is the case in the state of the art), on the cutting head or on the centering support of the laser cutting machine. The actual function of the nozzle centering device is to correctly align the laser beam in the aperture of the nozzle, which is carried out according to the invention in such a manner that in the released state of the clamping device the remaining cutting head part is displaced relative to the nozzle in lateral directions (X-Y) exclusively by means of the existing main drives of the machine. In this way semi-automatic or fully automatic nozzle centering can be implemented in a simple manner and without any considerable additional expenditure. This adjustment according to the invention has been constructed in such a manner that the movable part of the head section is fixed in the cutting head during the normal cutting operation of the machine.

Beside the cutting region on the machine, but still in the effective operation region of the main drives, there is arranged the proposed centering support of the adjusting station, which support serves as a receiving device and affixation device for the nozzle receiving device during the centering step of the nozzle.

BRIEF DESCRIPTION OF THE DRAWINGS

The invention is explained below in more detail with reference to the enclosed drawings that illustrate a preferred exemplary version of the laser processing machine according to the invention, in which.

DETAILED DESCRIPTION

Figure 1:
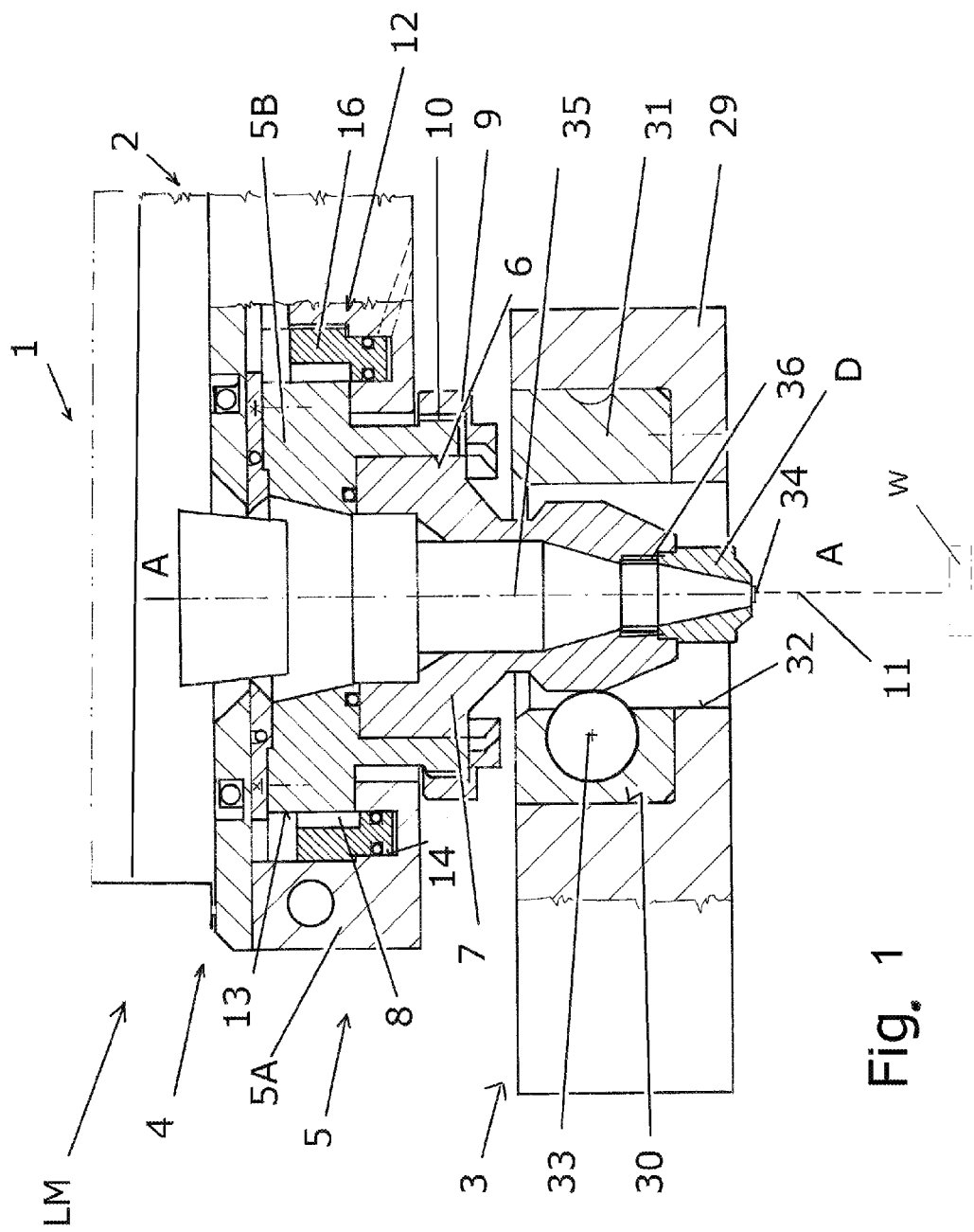
FIG. 1 is a diagrammatic section view of a first version of a work arm with a cutting head of the laser processing machine according to the invention in an adjusting station.

FIG. 1 diagrammatically shows the first version, that is, a part of a work arm 1 of a laser processing machine LM according to the invention, with a laser cutting head 2 arranged in an adjusting station 3. Preferably the adjusting station 3 is arranged beside a cutting region of the machine LM (not shown), but still in an effective working region of main drives of the machine LM, e.g. on a known work table (not shown).

The work arm 1 comprises, in the present version, known main laser head drives (not shown) with a central control system, preferably a CNC control system, which main drives are suitable for moving the work arm 1 together with the laser cutting head 2 according to the coordinates specified in each case (in the directions of the X-Y-Z axes) for processing a work piece W that has been affixed to the work table (e.g. in a manner described in EP-0680805B1, having counterpart U.S. Pat. No. 5,667,707A which is incorporated by reference, into the present disclosure).

FIG. 1 shows a partial section view of the design and arrangement of the laser cutting head 2 according to the invention. In this version, the laser cutting head 2 has a split design; it comprises two parts, namely an upper head section 4 and a lower head section 5. The upper head section 4 is affixed to the work arm 1 so that it can move together with the work arm 1. In the upper head section 4 optical elements (not shown) of the laser cutting head 2 (lens, lens holder, mirror, etc.) are arranged in a known manner.

However, the lower head section 5 has a special design according to the invention. Said lower head section 5 has a laterally displaceable head element and comprises an exterior housing 5A that is disconnectably connected to the upper head section 4, as well as a core piece 5B of annular design, which core piece 5B can be laterally displaced relative to the housing 5A for centering a nozzle D of the laser cutting head 2, and can be fixed after adjustment.

So in this version, the core piece 5B forms the laterally displaceable head element mentioned in the introduction. In a central aperture 6 of the core piece 5B a cylindrical nozzle receiving device 7 is arranged which at its lower end comprises a thread connection 36 with the coaxial nozzle D (FIG. 1).

In the lower head section 5, i.e. between the housing 5A and the core piece 5B, there is a cylindrical interior space 8 for the lateral relative adjustment of the core piece 5B (see FIGS. 1 and 2), together with the nozzle receiving device 7 and the nozzle D. In FIG. 1 the nozzle receiving device 7 is positionally attached in the aperture 6 of the core piece 5B by means of a union nut 9 that is connected to external threads 10 of the core piece 5B.

Thus, according to the invention the mutual radial/lateral position of the core piece 5B can be adjusted together with the nozzle receiving device 7 and the nozzle D (in X-Y directions) relative to the housing 5A for centering the nozzle D, which guides a laser beam 11 through the laser cutting head 2, but without additional adjustment devices between the nozzle D and the work arm 1 (as is the case in the state of the art).

A mirror (not shown) in the upper head section 4 is designed to reflect the laser beam 11 along an axis A-A, which laser beam 11 in a centered desired position comes in along the centre of the laser cutting head 2 and extends coaxially to a geometrical axis (designated by 35) of the nozzle D (see FIG. 1).

On the one hand, to fix the core piece 5B—together with the nozzle receiving device 7 and the nozzle D—in its centered position, and on the other hand to release this affixation for a new centering/adjustment, according to the invention a special releasable clamping device 12 is provided. In the exemplary version, this clamping device 12 is arranged between the housing 5A and the core piece 5B and in this way it makes possible a relative X-Y displacement of the core piece 5B with the nozzle receiving device 7 and the nozzle D in the lower head section 5. However, this clamping device 12 is constructed in such a manner that the core piece 5B with the nozzle receiving device 7 and the nozzle D are fixed in the cutting head 2 during the normal cutting operation of the machine LM. This will be explained in more detail below with reference to FIG. 2.

Figure 2:
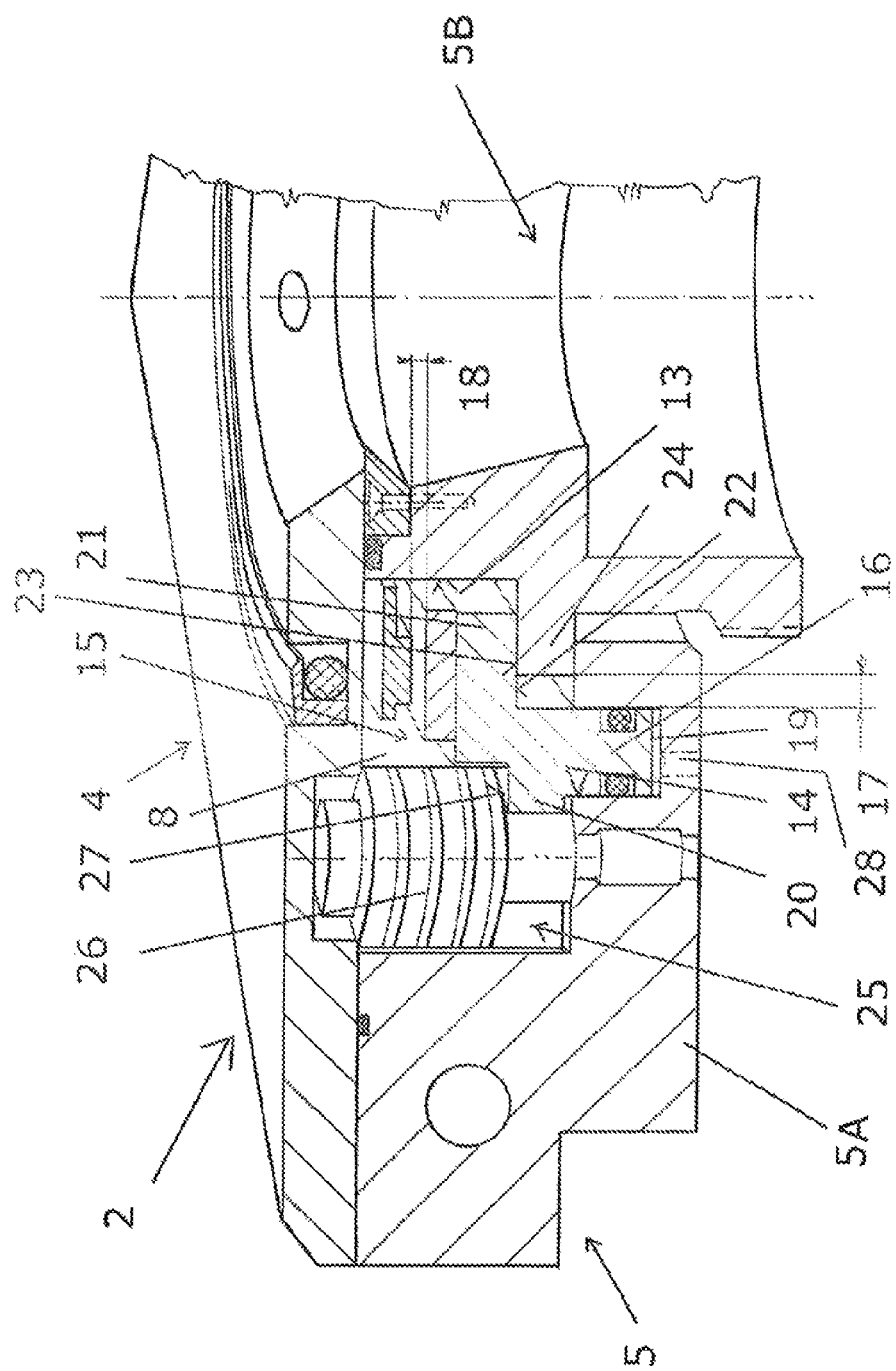
FIG. 2 is a cross section, shown in enlarged scale, of a part shown in FIG. 1.

In FIG. 2, the details of the releasable clamping device 12 according to the invention are shown more clearly. This clamping device 12 makes possible, as explained above, predetermined relative X-Y displacement of the core piece 5B, together with the nozzle receiving device 7 and the nozzle D, in the lower head section 5 during the centering step. In this exemplary version the annular space 8 is formed between an exterior mantle surface 13 of the core piece 5B and an interior mantle surface 14 of the housing 5A in which, as an actuating unit 15 of the clamping device 12, preferably an annular piston 16 is arranged so as to be slidable in axial direction.

In FIG. 2 the radial play of the movable core piece 5B is designated with the reference character 17, while the axial play of the annular piston 16 is designated with the reference character 18. The values of the plays or clearances 17 and 18 are preferably between 1.0 and 5.0 mm.

In this version, a pneumatic working space 19 is provided in the annular space 15 underneath the annular piston 16. In this case, the annular piston 16 comprises a radial exterior flange 20 and a radial interior flange 21. A lower clamping surface 22 of the interior flange 21 is seated on an upper clamping surface 23 of a radial exterior flange 24 of the core piece 5B in the shown affixing home/basic position (see FIG. 2). The radial exterior flange 20 of the annular piston 16 interacts with an elastic clamping unit 25, which in this version comprises four spring assemblies 26. These spring assemblies 26 are preferably designed in the form of coaxial disc springs and are preferably arranged in the housing 5A beside the annular space 8 so as to be offset from each other by 90°.

This co-operation between the clamping unit 25 and the annular piston 16 consists of the lowermost spring element of the spring assemblies 26 (see FIG. 2) continuously pushing downwards an upper supporting surface 27 of the exterior flange 20 of the annular piston 16 and in this manner forcing the annular piston 16 into its lower home position shown in which the annular piston 16 jams, i.e. fixes, the core piece 5B, together with the nozzle receiving device 7 and the nozzle D, in its position by means of the clamping surfaces 22 and 23 in the lower head section 5.

If the annular piston 16 is subjected to a pressure medium—in this case to compressed air—through holes 28 and the working space 19, the annular piston 16 moves upwards in axial direction against the spring force of the spring assemblies 26 of the elastic clamping unit 25. In this way the clamping effect of the clamping unit 25 is thus determined.

In this state, the mutual position of the core piece 5B, together with the nozzle receiving device 7 and the nozzle D, as well as of the housing 5A in the lower head section 5 (and also the position to the work arm 1, see FIG. 1) can be easily and reliably centered, between the nozzle D and the work arm 1, without any additional adjusting devices by means of the existing X-Y main drives of the machine LM.

After blocking the flow of compressed air to the working space 19 the spring assemblies 26 press the annular piston 16 downwards again into its home position, in which the core piece 5B, together with the nozzle receiving device 7 and the nozzle D, is jammed or fixed again in its centered position by the clamping surfaces 22 and 23. In other words, this mechanism is constructed in such a manner that the movable part of the construction, i.e. in this version the core piece 5B of the lower head section 5, during normal cutting operation of the machine LM is fixed at all times.

In a given case, according to the invention it is also possible to have such an inverse arrangement in which the laterally movable head element is formed by the housing 5A.

Turning our attention once more to FIG. 1, the adjusting station 3 according to the invention is now described in more detail. As mentioned above, the adjusting station 3 is, for example, arranged beside a cutting region, but within the effective region of the present main drives (X-Y-Z) of the laser processing machine LM and is used as a receiving device and affixation device for the nozzle receiving device 7 during centering. To this effect the adjusting station 3 comprises a centering support 29 which is preferably affixed to a frame (not illustrated) beside the work table of the machine LM. In a recess 30 of the centering support 29 a receiving unit 31 is held and fixed.

The receiving unit 31 is thus used as an adjusting unit and comprises a center hole 32 into which in the present case three rollers 33 partly reach in order to center and fix the inserted nozzle receiving device 7 in the adjusting station 3. The three centering rollers 33 are arranged circumferentially along the hole 32, preferably so as to be offset by 120° relative to each other.

In FIG. 1 a hole of the nozzle D is designated by 34 and the geometrical axis of the nozzle is designated by 35, which in the centered state of the nozzle D is coaxial to the axis A-A of the laser beam 11. The above-mentioned thread connection between the nozzle D and the nozzle receiving device 7 is designated in FIG. 1 with reference number 36.

The method of operation of the machine LM according to the invention according to FIGS. 1 and 2 is as follows:

If the nozzle D is to be adjusted or centered, the laser cutting head 2 is moved, by means of normal adjustment of the work arm 1, to the determined position of the centering support 29 in the adjusting station 3. After this step, the clamping of the core piece 5B, together with the nozzle receiving device 7 and the nozzle D, is released. This means that the annular piston 16 of the clamping device 12 is subjected to compressed air through the holes 28, and then the annular piston 16 moves upwards in axial direction against the spring force of the elastic clamping unit 25. In this way the clamping effect of the clamping unit 25 is thus released.

Thereafter the lower head section 5 can be moved downwards in the direction of the Z axis, wherein the movable core piece 5B of the lower head section 5 of the laser cutting head 2—together with the nozzle receiving device 7 and the nozzle D—in its released state is vertically moved to the nozzle receiving unit 31 of the centering support 29 of the adjusting station 3, where it is received and fixed.

Any checking or adjusting the laser beam 11 can then most easily be carried out in such a manner that from below some plastic tape (not shown) is stuck onto the underside of the nozzle D so that the briefly switched-on laser beam 11 can penetrate it and forms a hole in it. The actual position of this hole thus formed in the plastic tape is in the simplest case visually confirmed by the operator. Thereafter the optical position of the laser beam 11 is determined manually or automatically.

In another exemplary version of the invention the image of the hole is acquired by means of a camera module directed onto the stuck-on plastic tape (in a manner similar to that in EP-1,561,538) and is transferred as an image signal to a monitor (not shown) of the machine LM. The actual position of the hole (and indirectly also of the laser beam) is shown on the monitor preferably by means of a target.

If applicable, the hole image of the laser beam 11 can be subjected to an image analysis and can be immediately evaluated in a computer-controlled manner or manually, and thereafter corresponding corrections of positioning are carried out. However, according to the invention, the determined offset of the optical position of the laser beam 11 is correspondingly corrected by means of the present main axes drives X and Y of the machine LM, or by means of the CNC control system. In this way the centering process of the laser beam 11 is completed.

Since by means of this centering method the nozzle receiving device 7, together with the nozzle D and the core piece 5B, is fixed in the centering support 29 of the adjusting station 3, the housing 5A of the lower head section 5 can be correctly aligned/adjusted relative to the centre and to the geometrical axis 35 of the nozzle D by means of the main axes drives of the machine LM in the direction of the X-Y axes.

Subsequently the core piece 5B, together with the set centered position of the nozzle receiving device 7 and of the nozzle D, is clamped again by activating the clamping device 12. After this step the entire laser cutting head 2 can be moved by the work arm 1, from the adjusting station 3 in the direction of the Z axis by means of the main drive. Thereafter the nozzle D is, and remains, reliably fixed in the adjusted and centered state.

Figure 3:
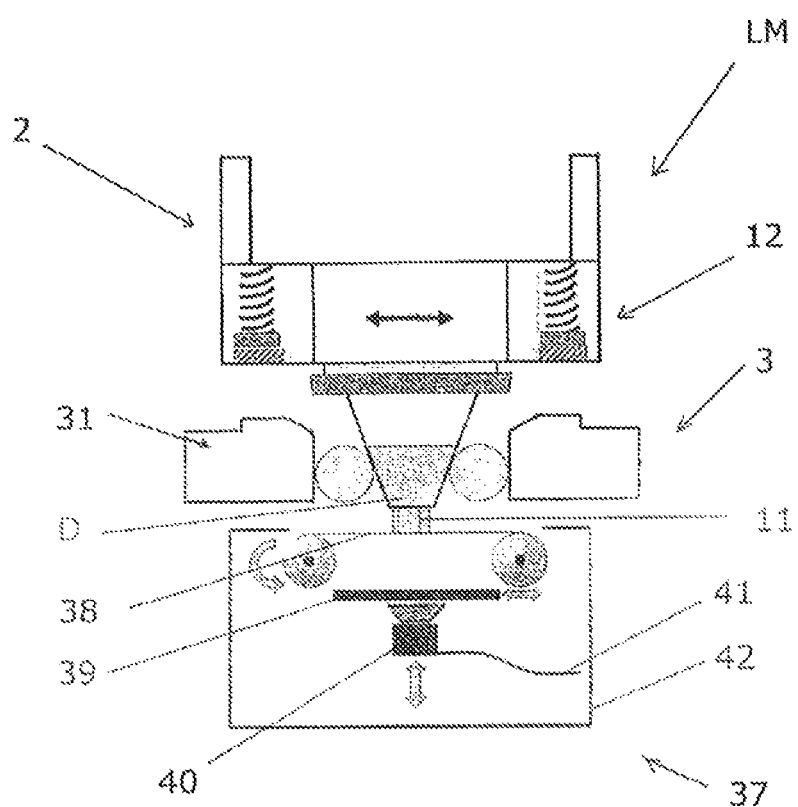
FIG. 3 is a diagrammatic view of a second exemplary version of the laser processing machine according to the invention in the adjusting station.

FIG. 3 diagrammatically shows a further exemplary version of the laser cutting machine LM according to the invention, in which the machine LM according to FIGS. 1 and 2 for the purpose of correctly aligning the laser beam 11 to the nozzle hole of the cutting nozzle D comprises an additional camera system 37 in the adjusting station 3.

For this purpose, in a manner similar to that mentioned above, the nozzle D is locked in the receiving unit 31 of the adjusting station 3, and adjustment itself is accomplished by laterally sliding the remaining cutting head relative to the nozzle D, wherein for this purpose, however, it is necessary to release first the clamping device 12.

In the version shown in FIG. 3 the camera system 37 of the adjusting station 3 comprises
   a target (target piece) 38 that is penetrated by means of a laser pulse (e.g. the target comprises a plastic film or a metal foil that is as thin as possible);
   an absorption plate 39 that can be moved away;
   a height-adjustable camera 40 associated with a known image processing unit 41 (not shown in further detail);
   a housing 42 that provides protection e.g. against dust.

As shown in FIG. 3, the camera system 37, which comprises the target 38, the removable absorption plate 39 and the height-adjustable camera 40, is underneath the receiving unit 31 provided for fixing the nozzle D in the adjusting station 3. The camera 40 is associated with the image processing unit 41.

Before the camera system 37 can be used, a calibration should be carried out:
   with the correctly adjusted nozzle D, a movement into the receiving unit 31 takes place to fix the nozzle;
   the target 38 is transported into one position;
   by means of a laser pulse a hole is made into the target 38;
   the absorption plate 39 is then moved away;
   the camera 40 acquires the hole and stores its position and size; this position is stored as zero in the system;
   the absorption plate 39 is moved back into place.

Subsequently the adjustment method is carried out as follows on the laser cutting machine LM according to the invention, as shown in FIG. 3:
   a) the laser cutting head 2 first moves over the receiving unit 31 of the adjusting station 3;
   b) the clamping device 12 of the laser cutting head 2 is then released;
   c) the laser cutting head 2 is moved into the receiving unit 31 to fix the nozzle;
   d) the clamping device 12 of the laser cutting head 2 is locked;
   e) the target 38 is transported into a predetermined position;
   f) by means of a laser pulse a hole is made in the target 38;
   g) the absorption plate 39 is then moved away;
   h) the camera 40 acquires the size and position of the hole;
   i) the absorption plate 39 is moved back into place;
   j) the position of the hole is compared to the calibration values by means of the image processing unit 41;
   k) if the position of the penetration hole does not coincide with the calibration position, the clamping device 12 of the laser cutting head 2 is released and the error is corrected with the main drives of the machine LM in the CNC axes; the clamping device 12 of the laser cutting head 2 is then locked again;
   l) for control purposes the above-mentioned procedure can be repeated;
   m) the laser cutting head 2 is moved out of the receiving unit 31 of the adjusting station 3, and thereafter normal operation of the machine LM can commence.

In a further version, the focal position can be determined. To this effect with various focal positions holes are made in the target, which after each "firing" is displaced by one working position. The camera evaluates the holes size. In the smallest hole the focus was in the target.

The invention thus makes it possible to achieve a semi-automatic or fully automatic centering of the nozzle, for which, however, no additional servo-motors or other adjusting devices are necessary between the nozzle head and the work arm, as is the case in the state of the art. By the invention the adjustment and construction of the laser cutting machine is significantly facilitated. The solution according to the invention makes it possible, without much effort, to reliably detect any deviation of the position of the laser beam from the desired/predetermined value, and to carry out suitable, simple, fast and reproducible correction for centering.

It should be emphasized that, within the scope of protection according to the enclosed claims, further embodiments of the laser processing machine according to the invention may be carried out, for which, knowing the present disclosure of the invention, a person having ordinary skill in the art would not, however, require any further technical teaching.

For example, in the releasable clamping device 12 the annular piston 16 could also be operated hydraulically or electro-magnetically. The spring assemblies 26 could, if applicable, be replaced by a coil spring or other spring elements, e.g. pneumatic spring units. In a further embodiment option, the nozzle receiving device 7 and the core piece 5B could be designed as an integrated, preferably single-part element. In this way the construction of the cutting head 5 could be further simplified.

The single annular piston 16 (of the versions shown) could, if applicable, be replaced by piston elements or piston segments that are arranged so as to be offset along the annular gap. Furthermore, such a design is also possible in which the machine LM comprises two or more laser cutting heads 2 (not illustrated).

Of course, it is also feasible for a laser cutting machine to be provided without a work table. This can apply, for example, to mobile laser cutting machines and oversize work pieces where the laser cutting machine is moved towards the work piece, wherein the work piece is affixed elsewhere, or wherein as a result of its size and weight does not require any affixation at all.

LIST OF REFERENCE CHARACTERS

A-A—Axis of laser beam
D—Nozzle
LM—Laser cutting machine
W—Work piece to be processed
1—Work arm
2—Laser cutting head
3—Nozzle adjusting station
4—Upper head section
5—Lower head section
5A—Housing
5B—Core piece
6—Aperture
7—Nozzle receiving device
8—Cylindrical interior space
9—Union nut
10—External threads
11—Laser beam
12—Releasable clamping device
13—Exterior mantle surface (of the core piece)
14—Interior mantle surface (of the housings)
15—Actuating member
16—Annular piston
17—Radial play (of core piece)
18—Axial play (of the piston)
19—Working space
20—Exterior flange
21—Interior flange
22—Lower clamping surface (of the interior flange)
23—Upper clamping surface (of the exterior flange of the core piece)
24—Exterior flange (of the core piece)
25—Clamping unit
26—Spring assembly
27—Upper supporting surface (of the annular piston)
28—Hole (for compressed air)
29—Centering support
30—Recess
31—Nozzle receiving unit
32—Cylindrical hole
33—Centering roller
34—Nozzle hole
35—Geometrical axis of nozzle
36—Thread connection
37—Camera system
38—Target
39—Absorption area
40—Camera
41—Image processing unit
42—Housing

What is claimed is:

1. A laser processing machine comprising:
a work arm;
a laser cutting head mounted on said work arm;
a nozzle receiver arranged in said work arm;
a nozzle configured to pass a laser beam, said nozzle connected to said nozzle receiver;
an alignment unit for adjusting the laser beam relative to said nozzle, said alignment unit including a head arrangement receiving said nozzle receiver;
an upper head section in said head arrangement;
a nozzle adjusting station, said nozzle adjusting station including a nozzle receiving unit configured to fix said nozzle against movement;
said alignment unit including a releasable clamping device configured to controllably release said nozzle for relative movement relative to said work arm and said laser cutting head;
laser head main drives operatively connected to controllably move said work arm and said laser cutting head relative to said nozzle when said nozzle receiving unit fixes said nozzle against movement and said clamping device releases said nozzle, said laser head main drives operatively connected to controllably move said work arm, said laser cutting head, and said nozzle for laser processing of workpieces; and,
a lower head section in said head arrangement, said lower head section including a laterally-slidable head piece connected to said nozzle receiver.

2. The laser processing machine as claimed in claim 1, wherein: said head piece is a cylindrical-core piece connected to said nozzle receiver.

3. A laser processing machine as claimed in claim 1, further comprising: said lower head section including an exterior housing operatively connected to said work arm through said upper head section, for movement with said work arm.

4. A laser processing machine as claimed in claim 1, further comprising: said releasable clamping device including an annular piston, said annular piston being arranged in an axially-extending annular space and being moveable between, (a) a first position in which said annular piston fixes said laterally-slidable head piece, and (b) a second position in which said annular piston releases said laterally-slidable head piece.

5. A laser processing machine as claimed in claim 4, further comprising:
said annular piston is pneumatically biased to said second position; and,
at least one clamping surface is connected to said annular piston to release said laterally-slidable head piece in said second position.

6. A laser processing machine as claimed in claim 4, further comprising:
said annular piston is spring-biased to said first position; and,
at least one clamping surface is connected to said annular piston to clamp said laterally-slidable head piece in said first position.

7. A laser processing machine as claimed in claim 4, further comprising:
said annular piston is pneumatically biased to said second position, and a first clamping surface is connected to said annular piston to release said laterally-slidable head piece in said second position;
said annular piston is spring-biased to said first position, and a second clamping surface is connected to said annular piston to clamp said laterally-slidable head piece in said first position; and,
an interior flange of said annular piston forms said first and second clamping surfaces.

8. A laser processing machine as claimed in claim 7, further comprising: said laterally-slidable head piece has an exterior flange, and said annular piston has an interior flange circumferentially spaced from said exterior flange.

9. A laser processing machine as claimed in claim 1, further comprising:
said releasable clamping device includes a clamping unit; and,
said clamping unit includes at least one spring unit.

10. A laser processing machine as claimed in claim 9, further comprising: said clamping unit includes three spring assemblies.

11. The laser processing machine as claimed in claim 1, wherein: said laterally-slidable head piece is arranged with a radial play having value in the range of 1.0 to 5.0 mm.

12. The laser processing machine as claimed in claim 1, wherein: said laterally-slidable head piece is integral with said nozzle receiver.

13. A laser processing machine as claimed in claim 1, further comprising: a work table for receiving material to be processed.

14. A laser processing machine as claimed in claim 1, further comprising:
a camera system provided underneath said nozzle receiving unit of said nozzle adjusting station, said camera system having a target for laser beam, said camera system having a removable absorption plate, and said camera system having a camera.

15. A laser processing machine as claimed in claim 14, further comprising: an image processing unit operatively communicating with said camera to process laser penetration hole images.

16. A laser processing machine beam alignment system comprising:
a work arm;
a laser cutting head mounted on said work arm;
a nozzle receiver arranged in said work arm;
a nozzle configured to pass a laser beam, said nozzle connected to said nozzle receiver;
an alignment unit for adjusting the laser beam relative to said nozzle, said alignment unit including a head arrangement receiving said nozzle receiver;
an upper head section in said head arrangement;
laser head main drives operatively connected to controllably move said work arm and said head arrangement in an X-Y coordinate space relative to said nozzle when said nozzle receiving unit fixes said nozzle against movement and said clamping device releases said nozzle, said laser head main drives operatively connected to controllably move said work arm, said laser cutting head, and said nozzle for laser processing of workpieces;
a nozzle adjustment station disposed in the X-Y coordinate space, said nozzle adjustment station having a nozzle receiving unit fixing said nozzle against movement in the X-Y coordinate space;
said alignment unit including a releasable clamping device configured to controllably release said head arrangement for controlled X-Y coordinate positioning alignment by said at least one main laser head drive, relative to said work arm and said nozzle fixed in said nozzle adjustment station; and
a lower head section in said head arrangement, said lower head section including a laterally-slidable head piece connected to said nozzle receiver.

17. A laser processing machine beam alignment system as claimed in claim 16, further comprising:
a laterally-slidable head piece included in said releasable clamping device;
said releasable clamping device including an annular piston, said annular piston being arranged in an axially-extending annular space and being moveable between, (a) a first position in which said annular piston fixes said laterally-slidable head piece, and (b) a second position in which the said annular piston releases said laterally-slidable head piece.

* * * * *